(12) United States Patent
Fukui

(10) Patent No.: US 7,849,158 B2
(45) Date of Patent: Dec. 7, 2010

(54) CONTENT DELIVERY SYSTEM

(75) Inventor: Mitsuhiro Fukui, Chofu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 779 days.

(21) Appl. No.: 11/274,092

(22) Filed: Nov. 16, 2005

(65) Prior Publication Data

US 2006/0064494 A1    Mar. 23, 2006

Related U.S. Application Data

(63) Continuation of application No. PCT/JP2004/009291, filed on Jun. 24, 2004.

(30) Foreign Application Priority Data

Jun. 25, 2003    (JP) .............................. 2003-180414

(51) Int. Cl.
| | |
|---|---|
| G06F 15/16 | (2006.01) |
| G06F 15/173 | (2006.01) |
| G06F 11/00 | (2006.01) |
| H04L 12/66 | (2006.01) |
| H04L 12/28 | (2006.01) |

(52) U.S. Cl. ...................... 709/218; 709/219; 709/223; 709/224; 709/226; 370/230; 370/352; 370/400

(58) Field of Classification Search ................ None
See application file for complete search history.

(56) References Cited

U.S. PATENT DOCUMENTS

| | | | |
|---|---|---|---|
| 6,470,378 B1 | 10/2002 | Tracton et al. | |
| 7,092,987 B2 * | 8/2006 | Brittingham et al. | ........ 709/203 |
| 2003/0110234 A1 * | 6/2003 | Egli et al. | .................... 709/217 |
| 2003/0217128 A1 * | 11/2003 | Yanosy | ....................... 709/223 |
| 2004/0032860 A1 * | 2/2004 | Mundra et al. | .............. 370/352 |
| 2004/0249942 A1 * | 12/2004 | Chatterjee et al. | ........... 709/225 |

FOREIGN PATENT DOCUMENTS

| | | |
|---|---|---|
| EP | 1 189 403 A1 | 3/2002 |
| EP | 1 311 125 A2 | 5/2003 |
| JP | 07-210510 | 8/1995 |
| JP | 2000-148513 A | 5/2000 |
| JP | 2002-083081 A | 3/2002 |
| JP | 2002-268950 A | 9/2002 |
| JP | 2002-297496 A | 10/2002 |
| JP | 2002-366476 A | 12/2002 |
| JP | 2002-373176 A | 12/2002 |

* cited by examiner

*Primary Examiner*—Ario Etienne
*Assistant Examiner*—Ho Shiu
(74) *Attorney, Agent, or Firm*—Kenyon & Kenyon LLP

(57) ABSTRACT

To provide a content delivery system, a content delivery server, an information processing terminal, a content delivery program and a content delivery method with which content can be delivered appropriately while accommodating variations in resource conditions. A content server receives a delivery request from an information processing terminal and a resource condition of that terminal, modifies content corresponding to the delivery request in accordance with the resource condition, and delivers the content. The information processing terminal extracts the resource condition, transmits the resource condition and/or a content delivery request to the content server, receives the content delivered from the content server, and executes the content.

9 Claims, 7 Drawing Sheets

(1) DESIGNATE PACKET NUMBERS TO BE DOWNLOADED INTO TERMINAL OR PACKET DROPPING CONDITION (2) DOWNLOAD PACKETS THAT MEET ABOVE CONDITION INTO TERMINAL

FIG. 5

| RESOURCE CONDITION | QoS CONTROL INFORMATION |
|---|---|
| PERCENTAGE OF CPU USAGE | LESS THAN 10%: DROP NO STREAMING DATA, EQUAL TO OR MORE THAN 10% AND LESS THAN 80%: DROP ONE FRAME PER EVERY FOUR FRAMES, EQUAL TO OR MORE THAN 80%: DROP ONE FRAME PER EVERY TWO FRAMES |
| FREE SPACE OF MEMORY | SET CONTENT INFORMATION AMOUNT EQUAL TO FREE SPACE MULTIPLIED BY PREDETERMINED VALUE |
| FREE SPACE OF STORAGE DEVICE | SET CONTENT INFORMATION AMOUNT TO BE DELIVERED SMALLER THAN FREE SPACE |
| SURFICIAL DISTANCE | MULTIPLY CHARGE BY 1.2 PER 100KM |
| ALTITUDE (E.G. WHEN INFORMATION ON TOP OF MOUNTAIN IS OBTAINED AT FOOT OF MOUNTAIN) | DOUBLE CHARGE PER 1KM |
| TIME (TIME REQUIRED FOR OBTAINING CONTENT) | 10 YEN PER 3 MINUTES |
| UTILIZATION TIME ZONE | 9:00-20:00: NORMAL CHARGE, 20:01-8:59 10% OFF |
| ACCESS CONDITION | MEMBER: 100 YEN PER CONTENT, NON-MEMBER: 300 YEN PER CONTENT |
| FORWARDING OPTION | FORWARD CONTENT TO CERTAIN ADDRESS |
| CHANGE CHARGE IN ACCORDANCE WITH CONDITION UPON OBTAINING CONTENT | 10% OFF DURING ADVERTISING CAMPAIGN, 5% OFF IF MULTIPLE CONTENT ITEMS ARE BOUGHT AT ONE TIME |

CONTENT DELIVERY SYSTEM

CROSS-REFERENCE TO RELATED APPLICATION

This is a continuation of Application PCT/JP2004/009291, filed on Jun. 24, 2004, now pending, the contents of which are herein wholly incorporated by reference.

BACKGROUND OF THE INVENTION

The present invention relates to a technology for delivering content via a network.

Conventionally, content (i.e. electronic data such as a computer program, a motion picture file, a web page (i.e. a file in the form of HTML etc.) or e-mail) received by a terminal is designed to operate under a resource condition that has been determined in advance.

For example, when motion picture streaming data is to be delivered via a network for reproduction on a terminal, such data that matches the communication speed and the processing power of the terminal is delivered.

Specifically, if the communication speed is high, high image quality data with a low compression ratio is delivered, while if the communication speed is low, low image quality data with a high compression ratio is delivered.

In view of the above, in the case that a content server is required to accommodate multiple resource conditions, it is necessary for the content server to store plural types of data of the same content corresponding to the respective resource conditions.

On the other hand, with development of multifunction of information processing terminals, a task of reproducing the content is sometimes executed in parallel with other tasks.

In that case, the resource condition sometimes varies in accordance with the priority of each task assigned to the CPU.

SUMMARY OF THE INVENTION

Disclosure of Invention

As described above, in the case that adaptation to multiple resource conditions is required, there is the problem that it is necessary to store multiple types of data of the same content in adaptation to the respective resource conditions. Therefore, the storage capacity required for the content increases in proportion to the number of the resource conditions, and the equipment expense increases enormously.

In addition, if multiple types of data for the respective resource conditions are to be stored, many designing processes for accommodating the respective resource conditions are required upon designing the content. Therefore, when a new terminal becomes available, it takes a significant time to prepare content that accommodates the resource condition of that terminal. Such a time lag has been a great problem in the business.

Furthermore, in the case of a terminal, such as a terminal that performs multiple tasks in parallel or a mobile terminal, in which a resource condition such as the processing power or the communication speed varies dynamically, even if an item (picked up from the content that have been prepared in advance as described above) that matches the resource condition is delivered, the resource condition can vary before the delivery is completed. This invites the problem that the delivery quality or the quality of service (QoS) cannot be assured.

The present invention has been made in view of the above-described problems of conventional arts. An object of the invention is to enables appropriate content delivery in adaptation with changes in resource conditions.

In order to solve the above-described problems, the present invention adopts the following means. A content delivery system according to the present invention comprises a content server and an information processing terminal that are connected via a network, wherein said content server includes:

receiving means receiving a delivery request from the information processing terminal and a resource condition of that terminal;

modification means modifying content corresponding to said delivery request in accordance with said resource condition; and delivery means delivering said content, and said information processing terminal includes: extraction means extracting the resource condition;

transmitting means transmitting said resource condition and/or a content delivery request to the content server;

receiving means receiving the content delivered from the content server; and execution means executing said content.

A content delivery server according to the present invention comprises:

receiving means receiving a delivery request from the information processing terminal and a resource condition of that terminal;

modification means modifying content corresponding to said delivery request in accordance with said resource condition; and delivery means delivering the content.

The above-described content delivery server may further comprise generation means generating QoS control information based on the resource condition received from said information processing terminal, wherein said modification means may add said QoS control information to said content, and said delivery means may deliver the content to which the QoS control information has been added.

The above-described content delivery server may further comprise:

detection means detecting whether or not a QoS control program is stored in said information processing terminal; and program sending means sending the QoS control program to said information processing terminal if it is found as a result of said detection that the QoS control program is not stored in the information processing terminal.

An information processing terminal according to the present invention comprises:

extraction means extracting a resource condition;

transmitting means transmitting said resource condition and/or a content delivery request to a content server;

receiving means receiving content delivered from the content server; and execution means executing said content.

In the above-described information processing terminal, said receiving means may receive content to which QoS control information is added, and said execution means may execute said content based on said QoS control information.

A content delivery program according to the present invention causes a content server to execute the steps of:

receiving a delivery request from an information processing terminal and a resource condition of that terminal;

modifying content corresponding to said delivery request in accordance with said resource condition; and delivering the content.

The above-described content delivery program may further comprise the steps of:

detecting whether or not a QoS control program is stored in said information processing terminal;

delivering, if it is found as a result of said detection that the QoS control program is not stored in the information processing terminal, the QoS control program that causes said information processing terminal to execute a step of extracting the resource condition, a step of transmitting said resource condition to the content server, a step of receiving the content delivered from the content server and step of executing said content.

The above-described content delivery program may further comprise a step of generating QoS control information based on the resource condition received from said information processing terminal, wherein said QoS control information may be added to said content in said step of modifying content, and the content to which said QoS control information has been added may be delivered in said step of delivering content.

In the above-described content delivery program may further comprise the step of:

detecting whether or not the QoS control program is stored in said information processing terminal; and sending the QoS control program to said information processing terminal, if it is found as a result of said detection that the QoS control program is not stored in the information processing terminal.

A content delivery method according to the present invention implemented by a content server and an information processing terminal that are connected via a network, wherein said content server executing the steps of:

receiving a delivery request from the information processing terminal and a resource condition of that terminal;

modifying content corresponding to said delivery request in accordance with said resource condition; and delivering said content, and said information processing terminal executing the steps of:

extracting the resource condition;

transmitting said resource condition and/or a content delivery request to the content server;

receiving the content delivered from said content server; and executing said content.

BRIEF DESCRIPTION OF THE DRAWINGS

FIG. 5 illustrates a control table.

DETAILED DESCRIPTION OF THE PREFERRED EMBODIMENT

In the following, embodiments of the present invention will be described with reference to the accompanying drawings.

Embodiment 1

Figure 1:
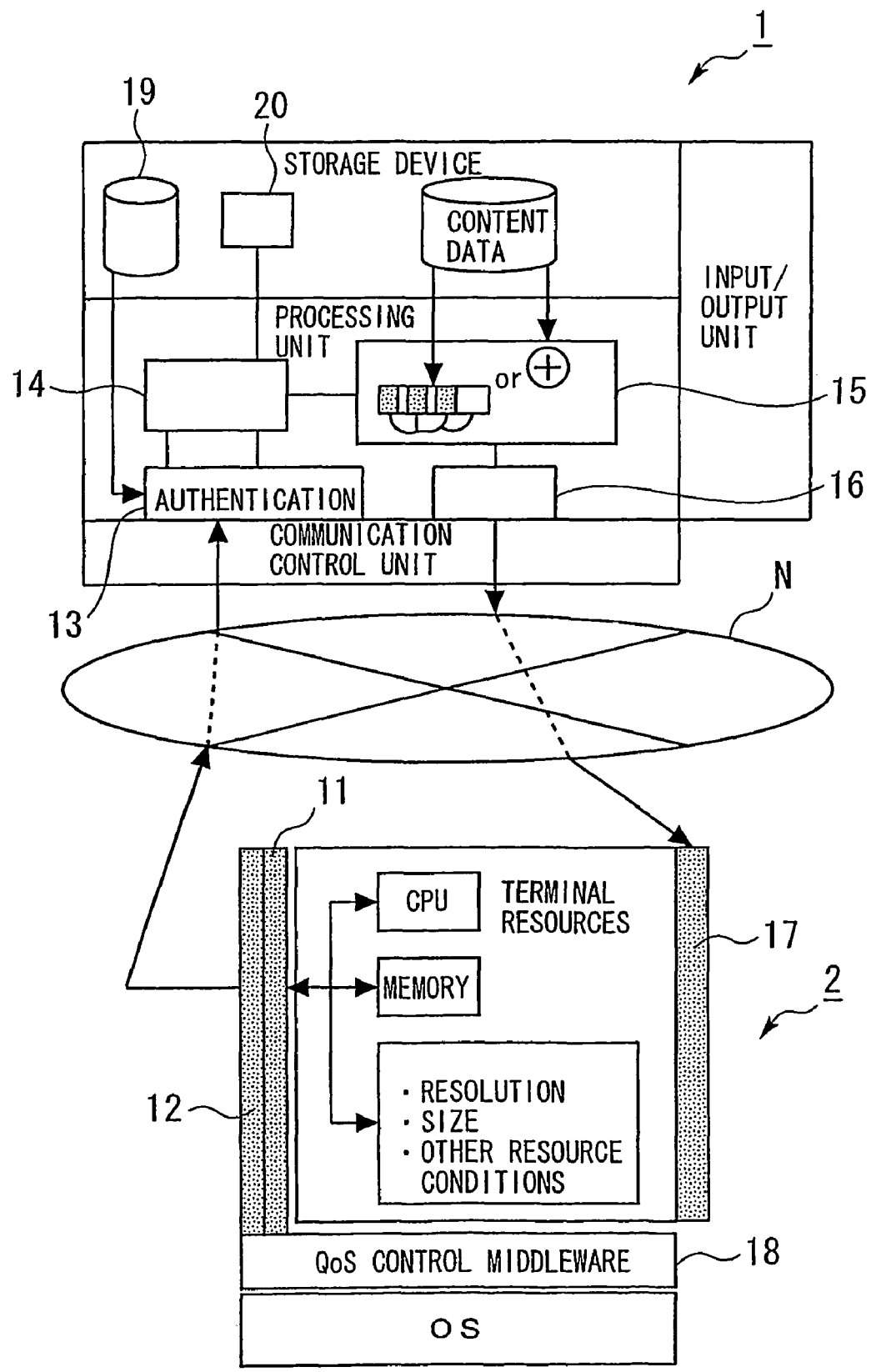
FIG. 1 is a diagram showing the basic structure of a content delivery system according to embodiment 1.

FIG. 1 is a diagram showing the basic structure of a content delivery system according to embodiment 1 that exemplifies the present invention.

This content delivery system includes a content server 1 and an information processing terminal 2 that are connected via a network N such as the Internet. Although one content server 1 and one information processing terminal 2 are illustrated in FIG. 1 for the sake of simplicity, a plurality of content servers and a plurality of information processing terminals may be connected.

§1 Content Server 1

The content server 1 is a general computer equipped with a processing unit including a CPU (central processing unit) and a main memory etc., a storage device (i.e. a hard disk) in which data used for processing and software are stored, an input/output unit and a communication control unit (CCU) etc.

To the input/output unit, input devices such as a keyboard or a mouse and output devices such as a display or a printer may be connected fitly.

The communication control unit is a unit such as a modem or a network card that functions to communicate with other computers via a network.

In the storage device, software including an operating system (OS) and a middleware (a content delivery program) etc. have been installed. Data of content to be delivered is also stored in the storage device. In addition, database 19 in which information on each information processing terminal is registered is created in the storage device. Furthermore, a control table is stored in the storage device. In the control table, resource conditions and QoS control information generated for each resource condition are registered in such a way that the resource conditions and the corresponding QoS control information are related to each other.

The processing unit realizes function of receiving means 13, generating means 14, modification means 15 and delivery means 16 by executing processing in accordance with the aforementioned content delivery program.

Functioning as the receiving means 13, the processing unit receives information (including resource condition etc.) from the information processing terminal 2 via the communication control unit, performs authentication, and registers the information received from the information processing terminal in the database.

Functioning as the generating means 14, the processing unit generates QoS control information based on the resource condition received from the information processing terminal.

Functioning as the modification means 15, the processing unit modifies the content corresponding to a delivery request in accordance with the aforementioned resource condition. In addition, the processing unit adds the QoS control information based on the resource condition to the aforementioned content.

Functioning as the delivery means 16, the processing unit delivers the content to which the QoS control information is added, through the communication control unit.

§2 Information Processing Terminal

The information processing terminal 2 is a general computer equipped with a processing unit including a CPU (central processing unit) and a main memory etc., a storage device (i.e. a hard disk) in which data used for processing and software are stored, an input/output unit and a communication control unit (CCU) etc.

To the input/output unit, input devices such as a keyboard or a mouse and output devices such as a display or a printer may be connected fitly.

The communication control unit is a unit such as a modem or a network card that functions to communicate with other computers via a network.

In the storage device, software including an operating system (OS) and a middleware (a QoS control program) etc. have been installed.

The processing unit realizes functions of extraction means 11, transmitting means 12, receiving means 17 and execution means 18 by executing processing in accordance with the QoS control program.

Functioning as the extraction means 11, the processing unit extracts resource condition including the processing power (or the speed) of the CPU in the information processing terminal, the percentage of the processing amount (or the percentage of CPU usage) in the CPU that the active task(s) occupy, the free space of the memory and the free space of the storage device etc.

Functioning as the transmitting means 12, the processing unit transmits the aforementioned resource condition and/or a delivery request for content to the content server 1.

The extraction and the transmission of the resource condition may be performed periodically or at a predetermined timing. Alternatively, they may be performed when a change in the resource condition occurs.

Functioning as the receiving means 17, the processing unit receives the content to which the QoS control information is added from the content server.

Functioning as the execution means 18, the processing unit executes the aforementioned content. For example, in the case that the content is streaming data of motion picture or music, the processing unit reproduces the data in real time. In the case that the content is a computer program, the processing unit installs and executes that program. In doing so, the execution means executes the content in accordance with the QoS control information.

§3 Content Delivery Method

Next, a method of content delivery executed by the aforementioned content delivery system, namely by the content server 1 and the information processing unit 2, will be described.

Figure 2:
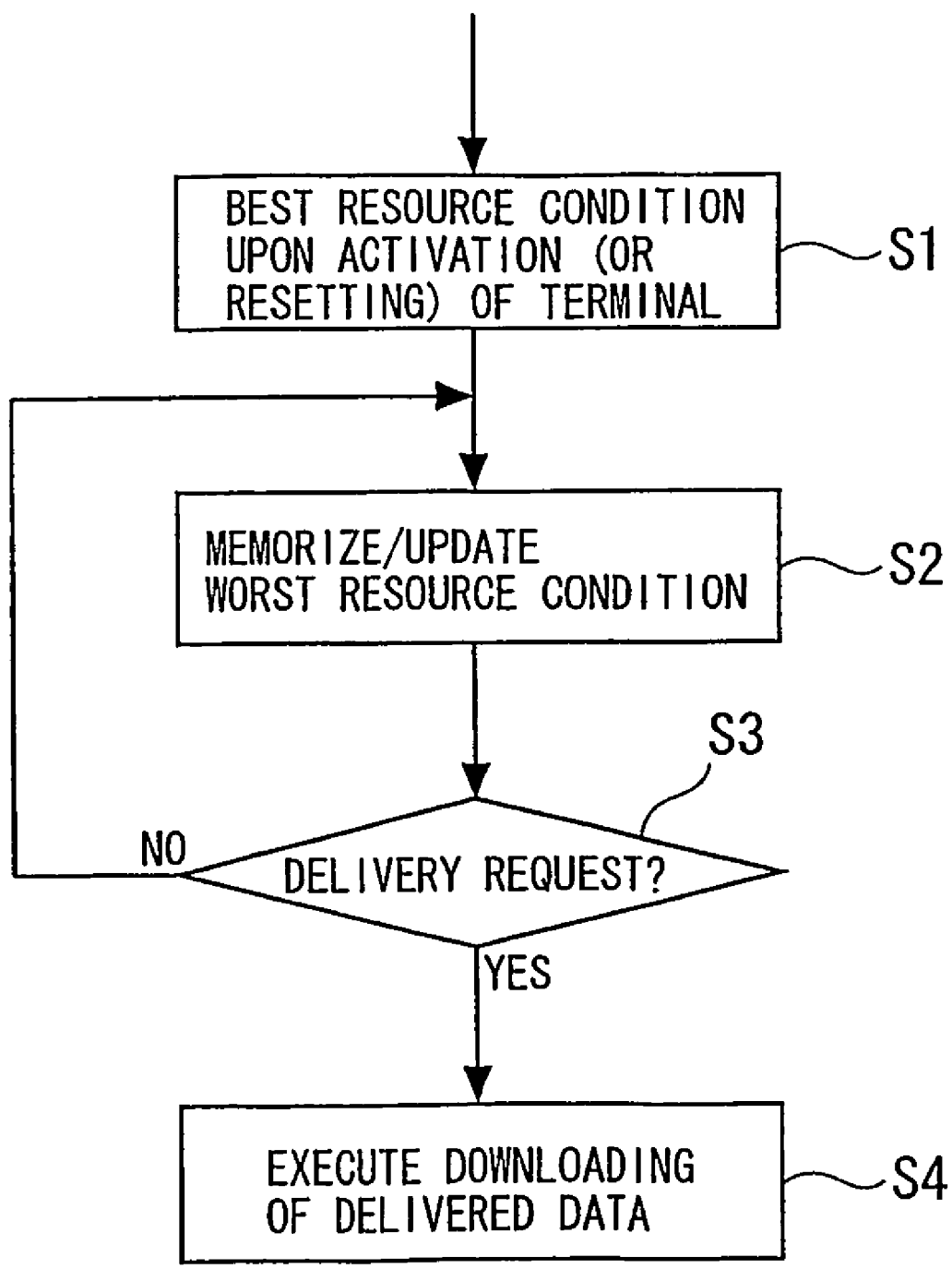
FIG. 2 is a chart illustrating steps executed by an information processing terminal.
Figure 3:
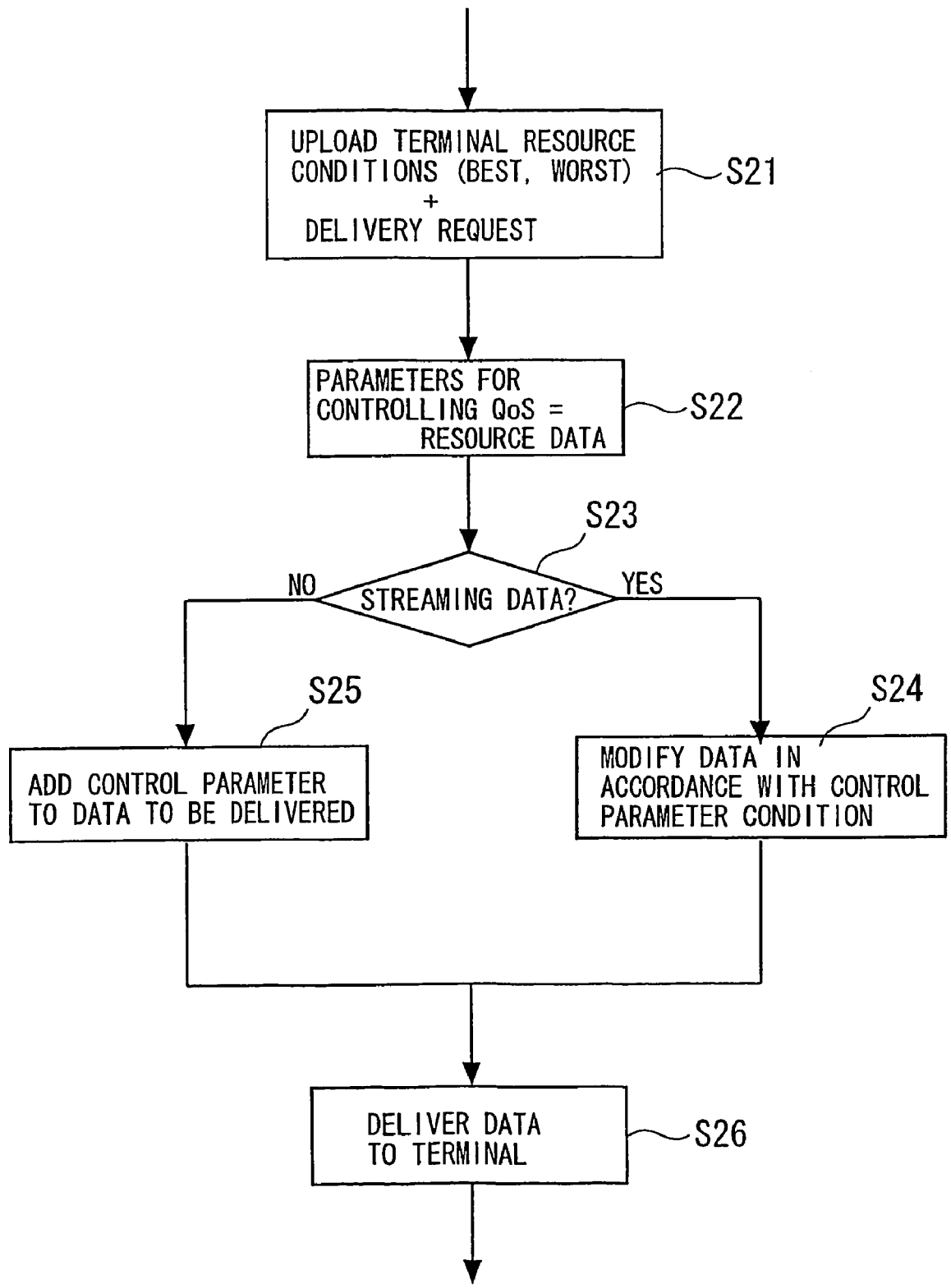
FIG. 3 a chart illustrating steps executed by a content server.

FIG. 2 is a chart illustrating steps of a process executed by the information processing terminal 2 in accordance with the QoS control program. FIG. 3 is a chart illustrating steps of a process executed by the content server 1 in accordance with the content delivery program.

With the function of the extraction means 11, the information processing terminal 2 extracts the processing power of the CPU, the memory size and the free space of the storage device etc. as the resource condition just after activation (i.e. the best resource condition) (step 1, which will be abbreviated as S1 and so on).

In addition, with the function of the extraction means 11, the information processing terminal 2 extracts resource condition including the CPU usage, the free space of the memory and the free space of the storage device etc. at predetermined intervals. Since the resource condition varies when another task is executed or data is stored after the activation, it is checked at predetermined time intervals and regarded as the worst resource condition (S2).

The information processing terminal 2 checks whether or not a delivery request has been made (S3). If a delivery request has not been made, the process returns to step 2 to wait until a delivery request is made.

When a user enters designation of content that he or she requests to deliver through the input unit of the information processing terminal, the information processing terminal 2 determines that a delivery request is made and transmits the best resource condition and the worst resource condition together with the delivery request to the content server 1 (S4).

On the other hand, the content server 1 receives the delivery request with the function of the receiving means 13 and performs authentication (S21) as shown in FIG. 3.

If the authentication is successful, the content server 1 generates, with the function of the generating means 14, QoS control information based on the resource information. The QoS control information is information that enables appropriate execution of the content in accordance with resource condition of the terminal. In this embodiment, the QoS control information that corresponds to the received resource condition is picked up from the control table 20 and used as the QoS control information.

FIG. 5 illustrates the control table 20 in which resource conditions and QoS control information generated for each resource condition are registered in such a way that the resource conditions and the corresponding QoS control information are related to each other. In the example shown in FIG. 5, there is generated control information that causes the streaming data to be executed without dropping any frame when the CPU usage is less than 10%, while dropping (or skipping) one frame per every four frames when the CPU usage is equal to or more than 10% and less than 80%, and dropping one frame per every two frames when the CPU usage is equal to or more than 80% (S22).

Then, the content server 1 determines whether the requested content is streaming data or not (S23).

In the case of streaming data, since it is necessary to deliver the data in real time, modification based on the QoS control information is performed by the content server 1. For example, motion picture data is thinned based on the QoS control to provide content with an appropriate information amount (S24).

Figure 4:
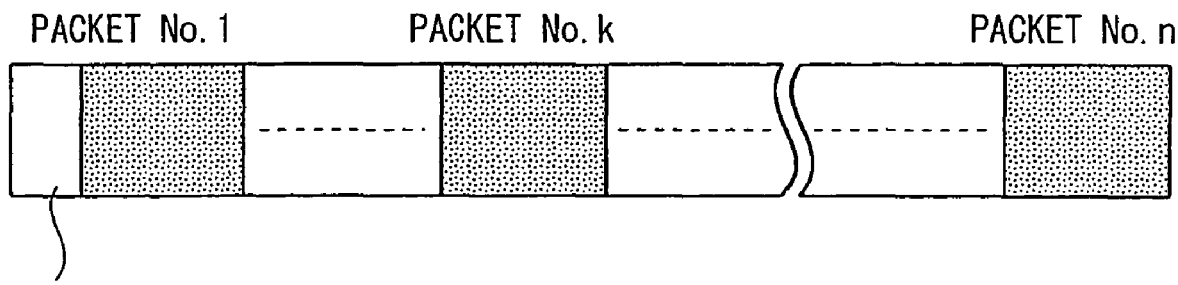
FIG. 4 illustrates packet numbers or a packet dropping condition.

On the other hand, in the case of non-streaming data, the QoS control information is added to the content. For example, as shown in FIG. 4, packet numbers to be downloaded into the terminal or packet dropping condition is designated in the header portion (S25).

With the function of delivery means 16, the content server 1 delivers the content that has been modified as described above or the content to which the QoS control information has been added, to the information processing terminal 2 (S26).

The information processing terminal 2 receives the content delivered from the content server 1 with the function of the receiving means 17 (S4), and executes that content with the function of the execution means 18 (S5). In the case that QoS information is added to the content, the information processing terminal 2 executes the content with the execution means 18 based on the QoS control information. For example, in the case that the packet numbers to be downloaded into the terminal or the packet dropping condition is designated in the header portion as shown in FIG. 4, the information processing terminal 2 downloads and executes the packets that correspond these packet numbers or meet the packed dropping condition.

The information processing terminal 2 extracts the resource condition periodically and/or at predetermined intervals even during the execution of the content.

Having received this resource condition, the content server 1 executes the aforementioned step 22 to step 26 to deliver the content that matches the resource condition.

As per the above, in this embodiment, dynamically changing resource condition of the information processing terminal to be controlled is fed back to the content delivery process in real time, so that appropriate delivery of content is made possible.

Embodiment 2

What is different in this embodiment from the above-described embodiment 1 is that a QoS control program is sent to an information processing terminal that does not have a QoS control program, and the other features are the same as in embodiment 1. Hence, the same reference signs are used for the elements same as those in the above-described embodiment 1 to omit redundant descriptions.

Figure 6:
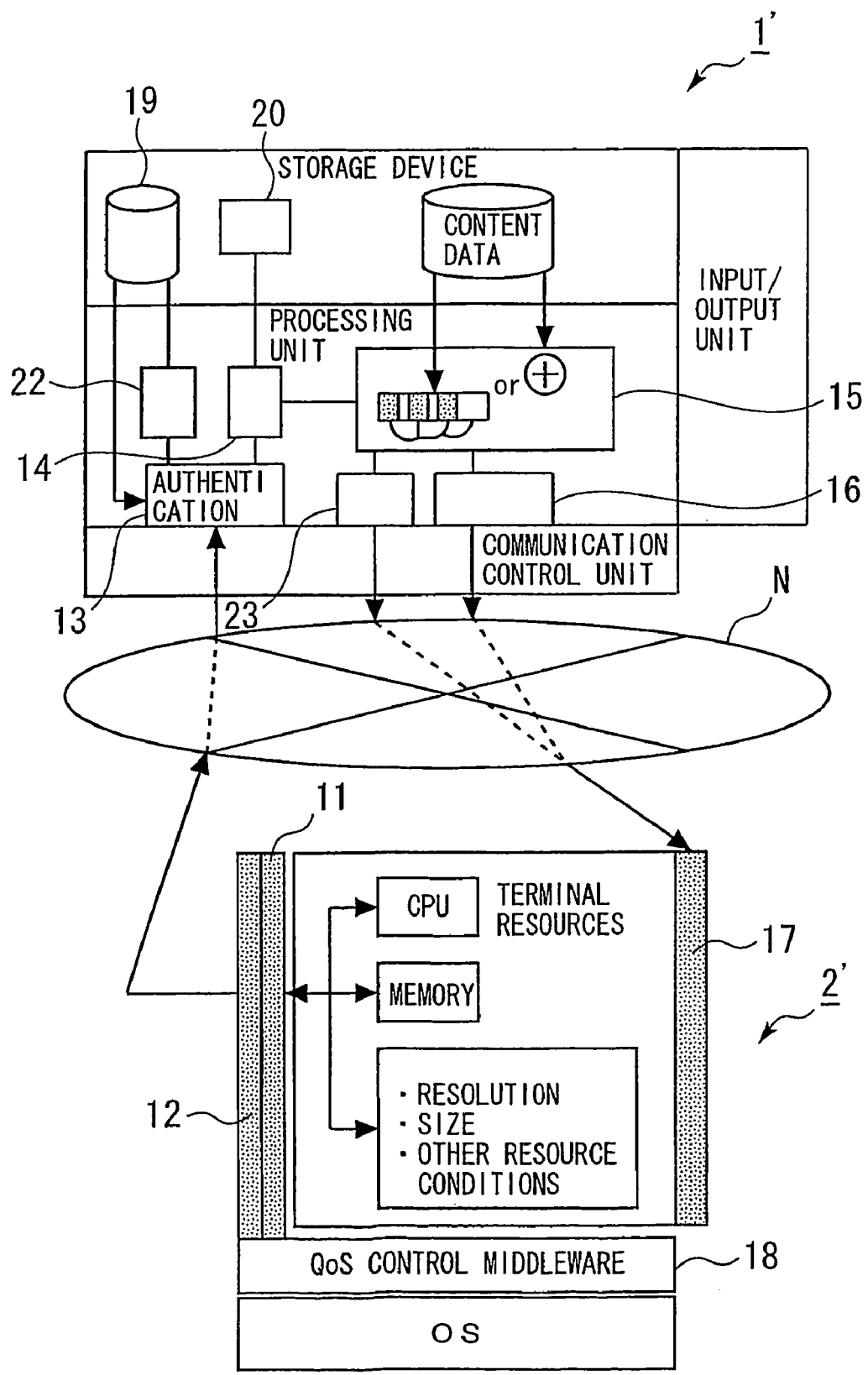
FIG. 6 is a diagram showing the basic structure of a content delivery system according to embodiment 2.

FIG. 6 shows the basic structure of a content delivery system according to this embodiment.

In the content server 1', the processing unit realizes function of detection means 22 and program delivery means 23 in addition to the above-mentioned functions by executing processing in accordance with the content delivery program.

Functioning as the detection means 22, the processing unit detects whether or not a QoS control program is stored in the information processing terminal 2'.

If it is found as a result of the above detection that a QoS control program is not stored in the information processing terminal, the processing unit functions as transmitting means to transmit a QoS control program 24 to the information processing terminal.

In connection with this, in the storage device of the content server 1', the QoS control program to be transmitted to the information processing terminal 2' is stored.

On the other hand, the information processing terminal 2' is a general computer equipped with a processing unit including a CPU and a main memory etc., a storage device (i.e. a hard disk) in which data used for processing and software are stored, an input/output unit and a communication control unit etc.

The information processing terminal 2' is equipped with general communication means such as a web browser, means for transmitting a request for content delivery to the content server 1' and means for receiving and executing a program from the content server 1'.

Figure 7:
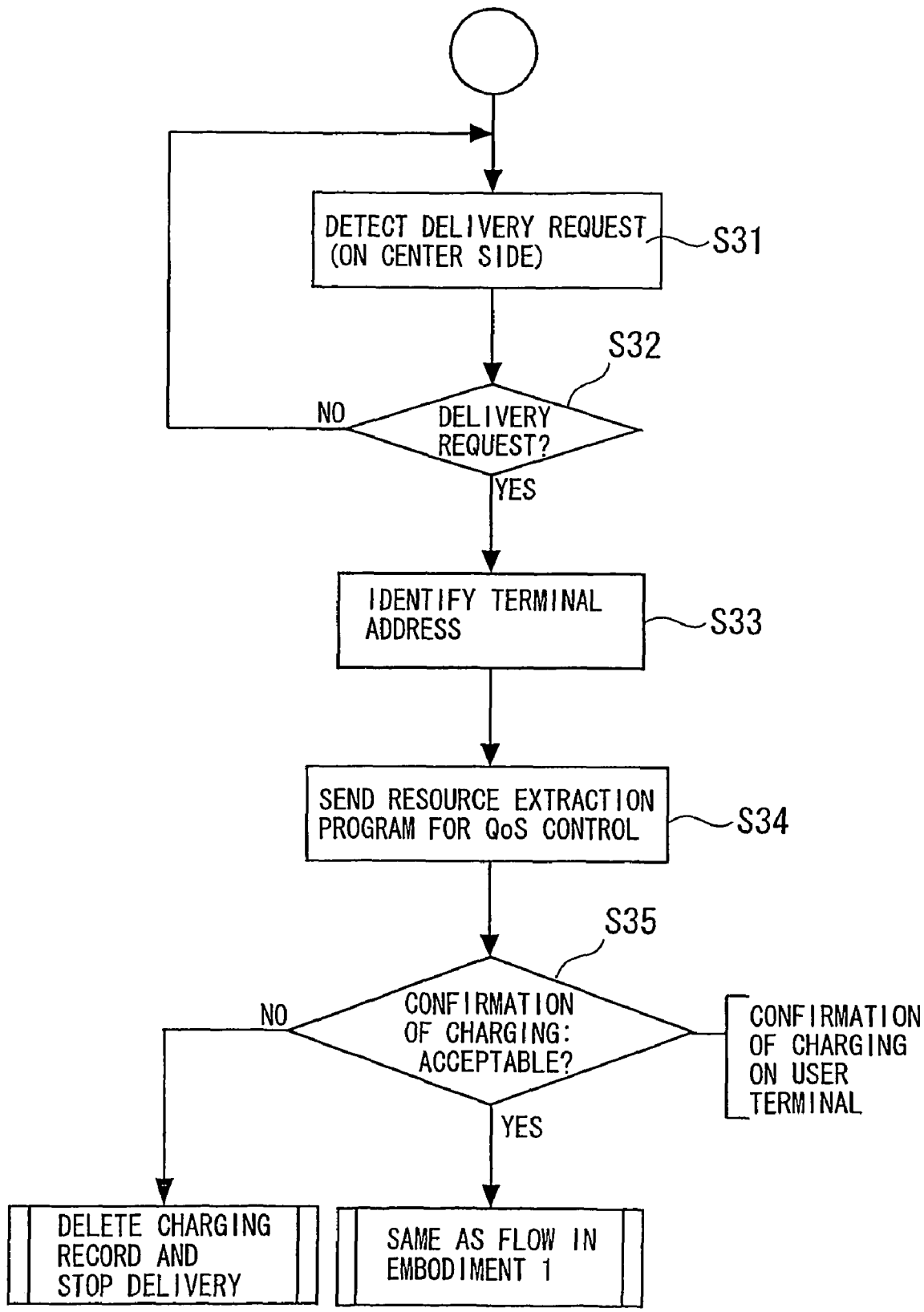
FIG. 7 is a chart illustrating a content delivery method according to embodiment 2.

FIG. 7 illustrates steps of a process executed by the content server 1' in accordance with the content delivery program.

Firstly, the content server 1' performs detection of a content delivery request from the information processing terminal 2' to determine whether or not the delivery request is present and waits until the delivery request is made (S31, S32).

When the content server 1' receives the delivery request, the content server 1' identifies, with the function of the detection means, the information processing terminal 2' based on the MAC address or the user ID etc. of the terminal 2' from which the delivery request originates, and if information on that terminal 2' is stored in the database, the contents server 1' detects that the QoS control program is stored in the terminal 2', and if, on the contrary, information on that terminal 2' is not stored in the database, the content server 1' detects that the QoS control program is not stored in the terminal 2' (S33).

In the case that the QoS control program is not stored in the information processing terminal 2', the content server 1' send the QoS control program 24 stored in the storing device to the aforementioned information processing terminal 2' (S34).

Then, the content server 1' send a message for giving information on charging to confirm whether the charging is acceptable to the user or not. If the user accepts the charging and the content server 1' receives a signal indicating acceptance of the charging from the terminal 2', the contents server 1' executes the steps same as those illustrated in FIG. 3 (S35).

On the other hand, the information processing terminal 2', which has received the QoS control program, realizes the functions of the extraction means 11, the transmitting means 12, the receiving means 12 and the execution means 18 by the processing according to the QoS control program to executes the steps same as those illustrated in FIG. 2.

In this way, it is possible to deliver appropriate content that accommodates variations in the resource condition even to an information processing terminal that does not have a QoS control program.

As per the above, thanks to the present invention, delivery of appropriate content that accommodates variations in the resource condition is made possible.

What is claimed is:

1. A content delivery system comprising a content server and an information processing terminal that are connected via a network, wherein the content server includes:

receiving means receiving a delivery request from the information processing terminal and a resource condition of that terminal;

modification means modifying content corresponding to the delivery request in accordance with the resource condition, the content containing Quality of Service (QoS) control information generated based on the resource condition, wherein the QoS control information causes frames to be dropped based on a CPU usage contained in the resource condition; and delivery means delivering the content, and the information processing terminal includes:

extraction means extracting the resource condition that dynamically changes during operation of the information processing terminal, the extraction means extracting the resource condition at predetermined intervals, at a predetermined timing, or when a change in resource conditions occurs;

transmitting means transmitting the resource condition and/or a content delivery request to the content server;

receiving means receiving the content delivered from the content server; and execution means executing the content, wherein the resource condition is changed by the operation of the information processing terminal, and wherein the resource condition of the information processing terminal transmitted by the transmitting means includes at least a first resource condition of the information processing terminal just after the information processing terminal is activated and a second resource condition of the information processing terminal as other tasks are being processed by the information processing terminal.

2. The information processing terminal according to claim 1, wherein the receiving means receives content to which the QoS control information is added, and the execution means executes the content based on the QoS control information.

3. The information processing terminal according to claim 1, wherein the resource condition of the information processing terminal received by the receiving means is a resource condition which changes after initiation of the information processing terminal.

4. The information processing terminal according to claim 3, wherein the receiving means received content to which the QoS control information is added, and the execution means executes the content based on the QoS control information.

5. The information processing terminal according to claim 1, wherein the receiving means receives content to which the QoS control information is added, and the execution means executes the content based on the QoS control information.

6. A content delivery method implemented by a content server and an information processing terminal that are connected via a network, the content server executing:
   receiving a delivery request from the information processing terminal;
   receiving a resource condition that dynamically changes during operation of the information processing terminal, of the information processing terminal at predetermined intervals, at a predetermined timing, or when a change in resource conditions occurs;
   modifying content corresponding to the delivery request in accordance with the resource condition, the content containing Quality of Service (QoS) control information generated based on the resource condition, wherein the QoS control information causes frames to be dropped based on a CPU usage contained in the resource condition; and
   delivering the content, and the information processing terminal executing:
   extracting the resource condition;
   transmitting the resource condition and/or a content delivery request to the content server;
   receiving the content delivered from the content server; and
   executing the content according to the QoS control information,
   wherein the resource condition is changed by the operation of the information processing terminal, and
   wherein the resource condition of the information processing terminal transmitted by the transmitting means includes at least a first resource condition of the information processing terminal just after the information processing terminal is activated and a second resource condition of the information processing terminal as other tasks are being processed by the information processing terminal.

7. A content delivery method implemented by a content server, the method comprising:
   receiving a request for content from an client terminal;
   receiving a first resource condition of the client, including current CPU usage, available memory and/or available storage data, from the client terminal;
   delivering the requested content to the client terminal based upon the first resource condition, the content containing Quality of Service (QoS) control information generated based on the resource condition, wherein the QoS control information causes frames to be dropped based on the CPU usage; and
   while the content is being delivered to the client terminal:
   receiving, at periodic intervals or when a change in resource conditions occur, updated resource conditions from the client terminal, and
   modifying the content being delivered to the client terminal based upon the updated resource conditions,
   wherein the resource condition is changed by the operation of the information processing terminal, and
   wherein the resource condition of the information processing terminal transmitted by the transmitting means includes at least a first resource condition of the information processing terminal just after the information processing terminal is activated and a second resource condition of the information processing terminal as other tasks are being processed by the information processing terminal.

8. An information processing terminal, comprising:
   receiving means receiving a delivery request from the information processing terminal and a resource condition of that terminal;
   modification means modifying content corresponding to the delivery request in accordance with the resource condition, the content containing Quality of Service (QoS) control information generated based on the resource condition, wherein the QoS control information causes frames to be dropped based on a CPU usage contained in the resource condition;
   delivery means delivering the content;
   extraction means extracting the resource condition that dynamically changes during operation of the information processing terminal, the extraction means extracting the resource condition at predetermined intervals, at a predetermined timing, or when a change in resource conditions occurs;
   transmitting means transmitting the resource condition and/or a content delivery request to the content server;
   receiving means receiving the content delivered from the content server; and
   execution means executing the content,
   wherein the resource condition is changed by the operation of the information processing terminal, and
   wherein the resource condition of the information processing terminal transmitted by the transmitting means includes at least a first resource condition of the information processing terminal just after the information processing terminal is activated and a second resource condition of the information processing terminal as other tasks are being processed by the information processing terminal.

9. A content server, comprising:
   receiving means receiving a delivery request from an information processing terminal and a resource condition of that terminal;
   modification means modifying content corresponding to the delivery request in accordance with the resource condition, the content containing Quality of Service (QoS) control information generated based on the resource condition, wherein the QoS control information causes frames to be dropped based on a CPU usage contained in the resource condition; and
   delivery means delivering the content,
   wherein the information processing terminal includes:
     extraction means extracting the resource condition that dynamically changes during operation of the information processing terminal, the extraction means extracting the resource condition at predetermined intervals, at a predetermined timing, or when a change in resource conditions occurs;

transmitting means transmitting the resource condition and/or a content delivery request to the content server;

receiving means receiving the content delivered from the content server; and execution means executing the content, wherein the resource condition is changed by the operation of the information processing terminal, and wherein the resource condition of the information processing terminal transmitted by the transmitting means includes at least a first resource condition of the information processing terminal just after the information processing terminal is activated and a second resource condition of the information processing terminal as other tasks are being processed by the information processing terminal.

* * * * *